(12) United States Patent
Deng et al.

(10) Patent No.: US 7,680,809 B2
(45) Date of Patent: Mar. 16, 2010

(54) PROFILE BASED CAPTURE COMPONENT

(75) Inventors: Jian Gong Deng, Foster City, CA (US); Stephen Lawrence, Mountain View, CA (US); Christopher M. Prince, Mountain View, CA (US); Mihai Florin Ionescu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 981 days.

(21) Appl. No.: 11/051,317

(22) Filed: Feb. 4, 2005

(65) Prior Publication Data

US 2005/0246588 A1 Nov. 3, 2005

Related U.S. Application Data

(63) Continuation-in-part of application No. 10/814,773, filed on Mar. 31, 2004.

(51) Int. Cl.
*G06F 17/00* (2006.01)
(52) U.S. Cl. ............... 707/102; 707/100; 707/104.1; 715/704; 715/761; 715/781; 715/803; 715/804; 715/806; 719/318
(58) Field of Classification Search ........... 707/100, 707/102, 104.1; 715/704, 761, 781, 803, 715/804, 806; 719/318
See application file for complete search history.

(56) References Cited

U.S. PATENT DOCUMENTS

| | | | |
|---|---|---|---|
| 4,410,957 A | 10/1983 | Cason et al. | |
| 5,280,612 A | 1/1994 | Lorie et al. | |
| 5,321,838 A * | 6/1994 | Hensley et al. | 717/125 |
| 5,555,346 A | 9/1996 | Gross et al. | |
| 5,566,336 A * | 10/1996 | Futatsugi et al. | 717/109 |
| 5,592,378 A * | 1/1997 | Cameron et al. | 705/27 |
| 5,701,469 A | 12/1997 | Brandli et al. | |
| 5,742,816 A | 4/1998 | Barr et al. | |
| 5,748,954 A | 5/1998 | Mauldin | |

(Continued)

FOREIGN PATENT DOCUMENTS

RU 2138076 C1 9/1999

(Continued)

OTHER PUBLICATIONS

Jonathan Bennett and Autolt Team, Autolt v3 Homepage, Aug. 13, 2004, version v3.0.102, 26 pages.*

(Continued)

*Primary Examiner*—John E Breene
*Assistant Examiner*—Phong Nguyen
(74) *Attorney, Agent, or Firm*—Fenwick & West LLP (57) ABSTRACT

An indexing system in a computer system may include applications, a capture processor, a queue, a search engine, and a display processor. The indexing system captures events of user interactions with the applications. Events are queued and if indexable, indexed and stored for user access through the search engine. Capture components in the capture processor can include a keyboard capture component that processes user keystrokes to determine events. A display capture component captures event data from windows associated with the applications. Display event data can be captured on a polling schedule or based on state changes of window elements. To determine target applications and window applications of interest application profiles and window profiles can be used.

23 Claims, 5 Drawing Sheets

U.S. PATENT DOCUMENTS

| | | | |
|---|---|---|---|
| 5,793,948 A | 8/1998 | Asahi et al. | |
| 5,881,315 A | 3/1999 | Cohen | |
| 5,907,836 A | 5/1999 | Sumita et al. | |
| 5,956,722 A | 9/1999 | Jacobson | |
| 5,961,610 A | 10/1999 | Kelly et al. | |
| 5,964,839 A | 10/1999 | Johnson et al. | |
| 6,006,222 A | 12/1999 | Culliss | |
| 6,014,665 A | 1/2000 | Culliss | |
| 6,055,579 A | 4/2000 | Goyal et al. | |
| 6,073,130 A | 6/2000 | Jacobson et al. | |
| 6,078,916 A | 6/2000 | Culliss | |
| 6,119,147 A | 9/2000 | Toomey et al. | |
| 6,175,830 B1 | 1/2001 | Maynard | |
| 6,182,065 B1 | 1/2001 | Yeomans | |
| 6,182,068 B1 | 1/2001 | Culliss | |
| 6,184,880 B1 * | 2/2001 | Okada | 715/704 |
| 6,199,067 B1 | 3/2001 | Geller | |
| 6,202,065 B1 | 3/2001 | Wills | |
| 6,209,000 B1 | 3/2001 | Klein et al. | |
| 6,226,630 B1 | 5/2001 | Bilmers | |
| 6,240,548 B1 | 5/2001 | Holzle et al. | |
| 6,275,820 B1 | 8/2001 | Navin-Chandra et al. | |
| 6,275,957 B1 | 8/2001 | Novik et al. | |
| 6,282,548 B1 | 8/2001 | Burner et al. | |
| 6,341,371 B1 | 1/2002 | Tandri | |
| 6,363,373 B1 | 3/2002 | Steinkraus | |
| 6,380,924 B1 | 4/2002 | Yee et al. | |
| 6,393,438 B1 | 5/2002 | Kathrow et al. | |
| 6,401,239 B1 | 6/2002 | Miron | |
| 6,446,076 B1 | 9/2002 | Burkey et al. | |
| 6,477,585 B1 | 11/2002 | Cohen et al. | |
| 6,480,837 B1 | 11/2002 | Dutta | |
| 6,490,577 B1 | 12/2002 | Anwar | |
| 6,513,036 B2 | 1/2003 | Fruensgaard et al. | |
| 6,526,405 B1 | 2/2003 | Mannila et al. | |
| 6,532,023 B1 | 3/2003 | Schumacher et al. | |
| 6,560,655 B1 | 5/2003 | Grambihler et al. | |
| 6,581,056 B1 | 6/2003 | Rao | |
| 6,592,627 B1 | 7/2003 | Agrawal et al. | |
| 6,604,236 B1 | 8/2003 | Draper et al. | |
| 6,658,423 B1 | 12/2003 | Pugh et al. | |
| 6,681,247 B1 | 1/2004 | Payton | |
| 6,691,175 B1 | 2/2004 | Lodrige et al. | |
| 6,708,293 B2 | 3/2004 | Kaler et al. | |
| 6,728,763 B1 | 4/2004 | Chen | |
| 6,772,143 B2 | 8/2004 | Hung | |
| 6,779,030 B1 | 8/2004 | Dugan et al. | |
| 6,826,553 B1 | 11/2004 | DaCosta et al. | |
| 6,853,950 B1 | 2/2005 | O-Reilly et al. | |
| 6,864,901 B2 * | 3/2005 | Chang et al. | 715/704 |
| 6,865,715 B2 | 3/2005 | Uchino et al. | |
| 6,873,982 B1 | 3/2005 | Bates et al. | |
| 6,907,577 B2 | 6/2005 | Tervo | |
| 6,934,740 B1 | 8/2005 | Lawande et al. | |
| 6,963,830 B1 | 11/2005 | Nakao | |
| 6,968,509 B1 * | 11/2005 | Chang et al. | 715/802 |
| 6,981,040 B1 | 12/2005 | Konig et al. | |
| 7,016,919 B2 | 3/2006 | Cotton et al. | |
| 7,080,073 B1 | 7/2006 | Jiang et al. | |
| 7,099,887 B2 | 8/2006 | Hoth et al. | |
| 7,162,473 B2 | 1/2007 | Dumais et al. | |
| 7,200,802 B2 | 4/2007 | Kawatani | |
| 7,233,948 B1 | 6/2007 | Shamoon et al. | |
| 7,245,910 B2 | 7/2007 | Osmo | |
| 7,328,242 B1 | 2/2008 | McCarthy et al. | |
| 7,330,536 B2 | 2/2008 | Claudatos et al. | |
| 7,383,307 B2 | 6/2008 | Kirkland et al. | |
| 7,412,491 B2 | 8/2008 | Gusler et al. | |
| 7,562,367 B1 * | 7/2009 | Arad | 719/318 |
| 2001/0016852 A1 | 8/2001 | Peairs et al. | |
| 2002/0042789 A1 | 4/2002 | Michalewicz et al. | |
| 2002/0049608 A1 | 4/2002 | Hartsell et al. | |
| 2002/0059425 A1 | 5/2002 | Belfiore et al. | |
| 2002/0065802 A1 | 5/2002 | Uchiyama | |
| 2002/0073076 A1 | 6/2002 | Xu et al. | |
| 2002/0078256 A1 | 6/2002 | Gehman et al. | |
| 2002/0091568 A1 | 7/2002 | Kraft et al. | |
| 2002/0091972 A1 | 7/2002 | Harris et al. | |
| 2002/0103664 A1 | 8/2002 | Olsson et al. | |
| 2002/0116291 A1 | 8/2002 | Grasso et al. | |
| 2002/0138467 A1 | 9/2002 | Jacobson et al. | |
| 2002/0156760 A1 | 10/2002 | Lawrence et al. | |
| 2002/0165903 A1 | 11/2002 | Zargham et al. | |
| 2002/0174101 A1 | 11/2002 | Fernley et al. | |
| 2002/0178383 A1 | 11/2002 | Hrabik et al. | |
| 2002/0184406 A1 * | 12/2002 | Aliffi | 709/318 |
| 2003/0001854 A1 * | 1/2003 | Jade et al. | 345/581 |
| 2003/0018521 A1 | 1/2003 | Kraft et al. | |
| 2003/0028506 A1 | 2/2003 | Yu | |
| 2003/0028896 A1 | 2/2003 | Swart et al. | |
| 2003/0041112 A1 | 2/2003 | Tada et al. | |
| 2003/0050909 A1 | 3/2003 | Preda et al. | |
| 2003/0055816 A1 | 3/2003 | Paine et al. | |
| 2003/0088433 A1 | 5/2003 | Young et al. | |
| 2003/0123442 A1 | 7/2003 | Drucker et al. | |
| 2003/0123443 A1 | 7/2003 | Anwar | |
| 2003/0126136 A1 | 7/2003 | Omoigui | |
| 2003/0130984 A1 | 7/2003 | Quinlan et al. | |
| 2003/0131000 A1 | 7/2003 | Bates et al. | |
| 2003/0149694 A1 | 8/2003 | Ma et al. | |
| 2003/0154071 A1 | 8/2003 | Shreve | |
| 2003/0167266 A1 | 9/2003 | Saldanha et al. | |
| 2003/0187837 A1 | 10/2003 | Culliss | |
| 2004/0003038 A1 | 1/2004 | Huang et al. | |
| 2004/0031027 A1 | 2/2004 | Hiltgen | |
| 2004/0054737 A1 | 3/2004 | Daniell | |
| 2004/0095852 A1 | 5/2004 | Griner et al. | |
| 2004/0098609 A1 | 5/2004 | Bracewell et al. | |
| 2004/0128285 A1 | 7/2004 | Green et al. | |
| 2004/0133560 A1 | 7/2004 | Simske | |
| 2004/0133561 A1 | 7/2004 | Burke | |
| 2004/0143569 A1 | 7/2004 | Gross et al. | |
| 2004/0155910 A1 * | 8/2004 | Chang et al. | 345/904 |
| 2004/0168150 A1 * | 8/2004 | Ziv | 717/116 |
| 2004/0187075 A1 | 9/2004 | Maxham et al. | |
| 2004/0193596 A1 | 9/2004 | Defelice et al. | |
| 2004/0215715 A1 | 10/2004 | Ehrich et al. | |
| 2004/0254938 A1 | 12/2004 | Marcjan et al. | |
| 2004/0255301 A1 | 12/2004 | Turski et al. | |
| 2004/0261026 A1 * | 12/2004 | Corson | 715/704 |
| 2004/0267700 A1 | 12/2004 | Dumais et al. | |
| 2005/0021542 A1 | 1/2005 | Irle et al. | |
| 2005/0033803 A1 | 2/2005 | Vleet et al. | |
| 2005/0057584 A1 | 3/2005 | Gruen et al. | |
| 2005/0060310 A1 | 3/2005 | Tong et al. | |
| 2005/0060719 A1 * | 3/2005 | Gray et al. | 719/318 |
| 2005/0076115 A1 | 4/2005 | Andrews et al. | |
| 2005/0108332 A1 | 5/2005 | Vaschillo et al. | |
| 2005/0114487 A1 | 5/2005 | Peng et al. | |
| 2005/0192921 A1 | 9/2005 | Chaudhuri et al. | |
| 2005/0262073 A1 | 11/2005 | Reed et al. | |
| 2006/0167704 A1 | 7/2006 | Nicholls et al. | |
| 2007/0022155 A1 | 1/2007 | Owens et al. | |
| 2007/0055689 A1 | 3/2007 | Rhoads et al. | |
| 2007/0208697 A1 | 9/2007 | Subramaniam et al. | |

FOREIGN PATENT DOCUMENTS

WO     WO 02/069118     9/2002

OTHER PUBLICATIONS

U.S. Appl. No. 10/749,440, filed Dec. 31, 2003, Badros et al.
U.S. Appl. No. 10/814,773, filed Mar. 31, 2004, Lawrence et al.

80-20 Software—Products—80-20 One Search, http://www.80-20.com/products/one-search/retriever.asp, printed Mar. 16, 2004.

"askSam™ Making Infgormation Useful," askSam—Organize your information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J. et al., "A Machine Learning Architecture for Optimizing Web Search Engines," School of Computer Science, Carnegie Mellon University, May 10, 1996, pp. 1-8.

Bradenbaugh, F., "Chapter 1 The Client-Side Search Engine," *JavaScript Cookbook*, 1$^{st}$ Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everday Aplications as Context for Just-in-time Information Access, Intelligent Information Laboratory, Northwestern University, pp. 1-8, no date.

DEVONthink, http://www.devon-technologies.com/products/devonthink.php, printed Mar. 16, 2004.

dSearch®—http://www.dtsearch,.com/, printed Mar. 15, 2004.

Dumais, S., et al, "Stuff I've Seen: A System for Personal Information Retrieval and Re-Use," Microsoft Research, *SIGIR'03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr020402 desktop shtmu, printed Mar. 16, 2004.

Fertig, S., et al., "Lifestreams: An Alternative to the Desktop Metaphor." http://www.acm.org/sigchi/chi96/procedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher: A Tour Gude for the World Wide Web," 1996.

Markoff, J. "Google Moves Toward Clash and Microsoft," *The New York Times*, May 19, 2004, http://www.nytimes.com/2004/5/19/technology/19google.htm?ex=1085964389&ei=1&e..., pp. 1-4, printed May 19, 2004.

Naraine, R. "Future Search Will Make You Dizzy," Enterprise, May 20, 2004, http://www.internetnews.com/ent-news/article.php/3356831, pp. 1-4, printed May 21, 2004.

"Overview," Stuff I've Seen—Home Page, http://research.Microsoft.com/adapts/sis/index.htm, pp. 1-2, printed May 26, 2004.

Rhodes, B., "Margin Notes Building a Contextually Aware Associative Memory," *The Proceedings of the International Conference on Intelligent User Interface(IUI'00)*, Jan. 9-12, 2000.

Rhodes, B., et al. "Just-in-time information retrieval agents." *System Journal*, vol. 39, Nos. 3&4, 2000, pp. 685-704.

Rhodes, B., et al., "Remembrance Agents—A continuously running automated information retrieval system." The Proceedings of the First International Conference on the Practical Application of Intelligent Agents and Multi Agent Technology (PAAM '96), pp. 487-495.

Rizzo, T., "WinFS 101: Introducing the New Windows File System," Longhorn Developer Center Home: Headline Archive:WinFS 101: Introducing the New . . . , http://msdn.Microsoft.com/Longhorn/archive/default.aspx?pull+/library/en-us/dnwinfs/htm . . . , pp. 1-5, printed Apr. 21, 2004.

"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.

"Selecting Task-Relevant Sources for Just-In-Time Retrieval," pp. 1-3, no date.

Sherman, C. "Hotbot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998, pp. 1-2.

Web Watcher Home Page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 Instantly searches files & email. For outlook, Outlook, http://www.x1.com/, printed Mar. 15, 2004.

Zellweger, P., et al., "Fluid Links for Informed and Incremental Link Transitions," Proceedings of Hypertext '98, Pittsburgh, PA, Jun. 20-24, 1998, pp. 50-57.

SpectorSoft Corporation, Spector Corporate Network Edition 4.0 (Spector CNE) Online User Manual, 2003, Retrieved from the Internet [retrieved on May 12, 2005] <URL: http://www.spectorsoft.com/products/spectorcne_windows/help/v40/webhelp/>.

International Search Report and Written Opinion, PCT/US2005/003386, Jun. 28, 2005.

"About Spector CNE," Spectorsoft, 1 page, [online] [Retrieved on May 23, 2007] Retrieved from the Internet: URL: http://www.spectorsoft.com/products/spectorcne_windows/help/v40/webhelp/About_Spector_CNE>.

International Preliminary Report on Patentabiity, PCT/US2005/003386, Jun. 24, 2005, 8 pages.

International Search Report and Written Opinion, PCT/US2005/010985, Apr. 26, 2007,9 pages.

International Search Report and Written Opinion, PCT/US2004/038562, Apr. 6, 2005.

Knezevic, P. et al., "The Architecture of the Obelix—an Improved Internet Search Engine," Proceedings of the 33$^{rd}$ Annual Hawaii International Conference on System Sciences (HICSS) Jan. 4-7, 2000, Maui, HI, USA, pp. 2145-2155.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

Bengel, J., et al., "Archiving and Indexing Chat Utterances," Electrical Engineering and Computer-Science and Information Technology Telecommunications Center University of Kansas, 2003.

Huang, Q., et al., Multimedia Search and Retrieval: New Concepts, System Implementation, and Application, Circuits and Systems for Video Technology, IEEE Transaction s on Circuits and Systems for Video Technology, Aug. 2000, pp. 679-692, vol. 10. Issue 5.

Pingali, G. S., et al., "Instantly Indexed Multimedia Databases of Real World Events," IEEE Transactions on Multimedia, Jun. 2002, pp. 269-282, vol. 4, Issue 2.

Sengupta, S., et al., Designing a Value Based Niche Search Engine Using Evolutionary Strategies, Proceedings of the International Conference of Information Technology: Coding and Computing (ITCC'05), IEEE, 2005, Pennsylvania State University.

PCT International Search Report and Written Opinion, PCT/US05/10687, Sep. 10, 2008, 14 Pages.

PCT International Search Report and Written Opinion, PCT/US05/10685, Jul. 3, 2008, 11 Pages.

Examination Report, European Patent Application No. 05731427.0, Jul. 28, 2008, 5 Pages.

European Examination Report, European Application No. EP 05731490.8, Jul. 7, 2008, 5 pages.

European Search Report, European Application No. EP 05731490.8, Apr. 28, 2008, 4 pages.

Bacon, J. et al., "Event Storage and Federation Using ODMG," 2000, pp. 265-281, vol. 2135, [online] Retrieved from the Internet<URL: http://citeseer.ist.psu.edu/bacon00event.html>.

Spiteri, M.D. et al., "An Architecture to Support Storage and Retrieval of Events," Sep. 1998, pp. 443-458, [online] Retrieved from the Internet<URL:http://citeseer.ist.psu.edu/spiteri98architecture.html>.

Spiteri, M.D., "An Architecture for the Notification, Storage and Retrieval of Events," Jan. 2000, pp. 1-165 pages, [online] Retrieved from the Internet<URL:http://citeseer.ist.psu.edu/spiteri00architecture.html>.

* cited by examiner

PROFILE BASED CAPTURE COMPONENT

RELATED APPLICATIONS

This application is a continuation in part ("CIP") of and claims priority from U.S. application Ser. No. 10/814,773, titled "Methods and Systems for Information Capture" and filed on Mar. 31, 2004 by Lawrence et al.

FIELD OF THE INVENTION

The invention generally relates to search engines. More particularly, the invention relates to methods and systems for information capture.

BACKGROUND OF THE INVENTION

Users generate and access a large number of articles, such as emails, web pages, word processing documents, spreadsheet documents, instant messenger messages, presentation documents, multimedia files, and the like using a client device, such as a personal computer, personal digital assistant, mobile phone or the like. Some articles are stored on one or more storage devices coupled to, accessible by, or otherwise associated with the client device(s). Users sometimes wish to search the storage device(s) for articles.

Conventional client-device search applications significantly degrade the performance of the client device. For example, certain conventional client-device search applications typically use batch processing to index all articles, which results in noticeably slower performance of the client device during the batch indexing. Additionally, batch processing occurs only periodically. Therefore, when a user performs a search, the most recently accesses or created articles are sometimes not included in the results. Moreover, if the batch indexing is scheduled for a time when the client device is not turned on, it may not take place for an extended period of time. In that case, the index of articles associated with the client device can become significantly outdated. Conventional client-device search applications can also need to rebuild the index at each batch indexing or build new partial indexes and perform a merge operation that can use a lot of client-device resources.

Conventional client-device search applications also sometimes use a great deal of system resources when operational, resulting in slower performance of the client device.

Additionally, conventional client-device search applications generally require the user to explicitly provide a search query to the search application to generate results, and may be limited to examining file names or the contents of a particular application's files.

SUMMARY OF THE INVENTION

A computer based method for capturing event data from a target window of a target application in a computer system includes comparing window information with a target window profile that is associated with the target window of the target application and capturing event data from the target window upon detecting a state change of a state associated with an element in the window. Embodiments of the present invention include methods, systems, and computer-readable media for information capture, storage, and indexing.

In one embodiment, a method for capturing event data from a target window of a target application in a computer system additionally includes receiving window creation information from an application and determining whether the application is an instance of the target application. In one embodiment, to make this determination the window creation information is compared with a target application profile, which is associated with the target application.

In another embodiment, a computer based method for indexing events in a computer system includes receiving captured event data from a target window. The target window is associated with a target application. The method also includes determining an event based on the target application and also based on user input. In this embodiment, the method also includes determining whether to index the captured event data and storing the event.

Another aspect of the invention provides a computer-based method for determining indexing events by receiving a plurality of display calls. The display calls are associated with computer applications in the computer system. The method includes processing the plurality of display calls to determine a target window. The processing is based on target window profiles. The method also includes determining an event based, at least in part, on data captured from the target window.

In yet another embodiment, the invention provides a method that compares application related data with stored target application profiles associated with a plurality of target applications. The application related data is from applications associated with windows executing in a computer system. The method also includes subscribing to window creation events through the operating system of the computer system. Window creation request information is received from an application. The window creation request information is compared with the stored target application profiles. Then establishing hooks into processes for each target application. Window element information for each process of each target application is compared with a plurality of stored target window profiles associated with target windows of the target applications. The method also includes monitoring state changes for states associated with display elements in windows matching a target window profile. In this embodiment, the method includes capturing from each matched window event data upon detecting a state change of the monitored states. The event data is captured into an event associated with each matched window. This capturing includes modifying application behavior of the matched applications based on the capture component code. The method also includes completing the events associated with the matched windows in response to closure of the matched window.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

DETAILED DESCRIPTION OF SPECIFIC EMBODIMENTS

Figure 1:
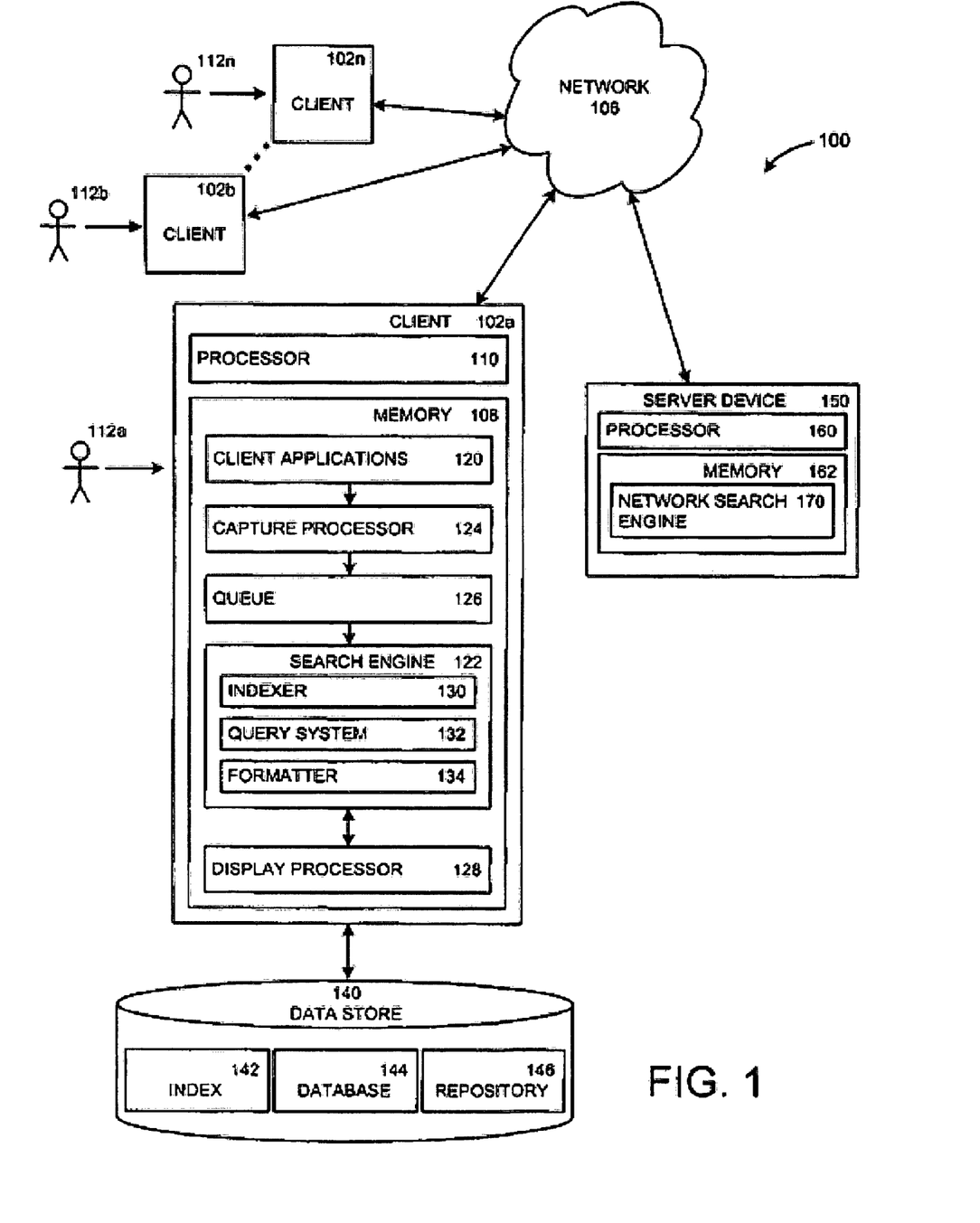
FIG. 1 is a diagram illustrating an exemplary environment in which one embodiment of the present invention may operate.

Referring now to the drawings in which like numerals indicate like elements throughout the several figures, FIG. 1 shows a diagram illustrating an exemplary environment in which one embodiment of the present invention may operate. While the environment shown in FIG. 1 reflects one client-side search engine architecture embodiment, other client-side or server-side embodiments are possible. The system 100 includes multiple client devices 102a-n that can communicate with a server device 150 over a network 106, e.g., the Internet. In other embodiments, other networks, such as an intranet home local area network ("LAN"), or the like, may be used instead. Moreover, in other embodiments, functions described with respect to a client or a server in a distributed network environment may take place within a single client device without a server device or a network. The implementation of these techniques as well as similar adaptations falls within the scope of this invention.

The client devices 102a-n shown in FIG. 1 each include a computer-readable medium 108, e.g., memory devices, storage media, and the like. In one embodiment, a client device 102a includes a random access memory (RAM) 108 coupled to a processor 110. The processor 110 executes computer-executable program instructions stored in memory 108. Such processors may include a microprocessor, an ASIC, state machines, or other processors, and can be any of a number of suitable computer processors, such as processors from Intel Corporation of Santa Clara, Calif. and Motorola Corporation of Schaumburg, Ill. Such processors include, or may be in communication with, media 108, for example computer-readable media, which stores instructions that, when executed by the processor, cause the processor to perform the steps described herein. Embodiments of computer-readable media 108 include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may include code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In one embodiment, the client devices 102a-n may be any type of processor-based platform that operates on any suitable operating system, such as Microsoft® Windows® or Linux, and that are capable of executing one or more client application programs. For example, the client device 102a can include a personal computer executing client application programs, also known as client applications 120. The client applications 120 can be contained in memory 108 and can include, for example, a word-processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications 120 may also include client-side applications that interact with or accesses other client or remote applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information in electronic form suitable for storage access in client devices.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing), interacting with windows associated with the client applications, and any other suitable occurrence associated with an article, a client application program, or the client device whatsoever. Additionally, event data can be generated when the client device 102a interacts with an article independent of the user 112a, such as when receiving an email or performing a scheduled task.

In one embodiment, the memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can include, for example, any suitable rule or convention facilitating data exchange, and can include, a communication mechanism: such as, for example, Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and extracting event data associated with an event. Examples of events include sending or receiving an instant messenger message, a user viewing a web page, saving a word processing document, printing a spreadsheet document, inputting text to compose or edit an email, opening a presentation application, closing an instant messenger application, entering a keystroke, moving the mouse, hovering the mouse over a hyperlink, clicking on buttons in windows, selecting from menus, or the like. An example of event data captured by the capture processor 124 for an event involving the viewing of a web page by a user includes the URL of the web page, the time and date the user viewed the web page, and content of the web page. In addition, in one embodiment additional event data can be captured from remote locations that include information related to the event or article. For example, artist and other related information, e.g., album, director, genre, and the like, for a movie or music file accessed by a user can be retrieved from a network database server across the network 106.

In one embodiment, the capture processor 124 may include multiple capture components. For example, the capture processor 124 can include a separate capture component for each client application in order to capture events associated with each application. The capture processor 124 can also include a separate capture component to monitor and capture keystrokes input by the user and a separate capture component that can monitor and capture items, such as text, displayed on a display device associated with the client device 102a. The keystroke capture component and the display capture component can be used to capture events when a client application capture component is not available for a client application or in conjunction with a client application capture component. The keystroke capture component can also contain or access a keystroke database. The keystroke database can provide correlation between keystrokes and actions for applications. The keystroke capture component and the display capture component can also contain or access a history of previous keyboard or display events.

In one embodiment, the capture processor 124 can include a separate capture component that monitors overall network activity in order to capture event data associated with network activity, such as the receipt of an instant messenger message. The capture processor 124 can include a separate capture component that monitors overall client device performance data, such as processor load, idle time, disk access, the client applications in use, and the amount of memory available. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schemas can differ depending on the client application or activity the capture component is monitoring. Generally, the event schema can describe the format for an event, for example, by providing fields for event data associated with the event (such as time of the event) and fields related to any associated article (such as title) as well as the content of any associated article (such as document body). An event schema can describe the format for any suitable event data that relates to an event. For example, an event schema for user input, such as words typed or displayed to a display device, can include the application used for the input, the format of the text, the words and other items input, and the time input. An event schema for an email event received by a user can include header information, such as the content from the subject, to, from, cc, and time received fields, and body information. An event schema for a web page currently being viewed by a user can include the Uniform Resource Locator (URL) of the web page, the time being viewed, and the content of the web page. An event schema for a word processing document being saved by a user can include the title of the document, the time saved, the location of the document, the format of the document, the text of the document, and a pointer to the location of the document.

In one embodiment, the keyboard capture component may not use an event schema. Rather, in this embodiment, the keyboard capture component can convert keystrokes to a sequence of words and then can pass the sequence of words to another component, such as the word processing capture component. The word processing capture component can use an event schema to express information sent by the keystroke capture component.

More generally, an event schema can describe the state of the system around the time of the event. For example, an event schema can contain a URL for a web page event associated with a previous web page that the user navigated from. In addition, event schema can describe fields with more complicated structure like lists. For example, an event schema can contain fields that list multiple recipients. An event schema can also contain optional fields so that an application can include additional event data if desired.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message ("IM") or electronic mail ("email"). Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140.

Alternatively, in one embodiment, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an email or pasting a sentence in a word processing document, closing an article, such as closing an instant messenger window or changing an email message being viewed, loading, saving, opening, or viewing an article, such as a word processing document, web page, or email, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102a was operational or because no capture component existed for a specific type of historical event at the time the event took place. Examples of historical events include the user's saved word processing documents, media files, presentation documents, calendar entries, and spreadsheet documents, the emails in a user's inbox, and the web pages bookmarked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102a. For example, the email application may have to retrieve emails from a server device. In one embodiment, the search engine 122 indexes historical events.

In the embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126 or how detailed the events are that are sent (fewer or smaller events when the system is busy) or how frequently events are sent (events are sent less often when the system is busy or there are too many events waiting to be processed). The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can include one or more separate queues, for example, a user state queue and an index queue. In one embodiment, the index queue can queue indexable events. Alternatively, the queue 126 can have additional queues or include a single queue. The queue 126 can be implemented as a circular priority queue using memory mapped files. The queue can be a multiple-priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

Referring back to FIG. 1, in one embodiment, the search engine 122 can contain an indexer 130, a query system 132, and a formatter 134. The query system 132 can retrieve all real-time events and performance data from the queue 126. The query system 132 can use performance data and real-time events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one method or a combination of methods for storing data, including without limitation, arrays, hash tables, lists, and pairs, and may include compression and encryption. In the embodiment shown in FIG. 1, the data store includes an index 142, a database 144 and a repository 146.

In the embodiment shown in FIG. 1, when the indexer 130 receives an event, the indexer 130 can determine, from the event schema, terms (if any) associated with the event, the time of the event (if available), images (if any) associated with the event, and/or other information defining the event. The indexer 130 can also determine if the event relates to other events and associate the event with related events. For example, for an event concerning a web page, the indexer 130 can associate this event with other events concerning the same web page. This association information can be stored in the database 133 in a document for each group of related events.

The indexer 130 can send and incorporate the terms and times associated with the event in the index 142 of the data store 140. The event can be sent to the database 144 for storage and the content of the associated article and any associated images can be stored in the repository 146. The conversation object associated with instant messenger messages can be stored in the database 144.

In the embodiment shown in FIG. 1, a user 112a can input an explicit query into a search engine interface on the client device 102a, which is received by the search engine 122. In one embodiment, the search engine interface on the client device 102a includes a graphical/textual display, e.g., an HTML-based web page. In alternative embodiments the search engine interface includes various input/output modes—for example, a voice activated system, a touch based system, or the like.

The search engine 122 can also generate an implicit query based on a current user state, which can be determined by the query system 132 from real-time events. Based on the query, the query system 132 can locate relevant information in the data store 140 and provide a result set. In one embodiment, the result set includes article identifiers for articles associated with the client applications 120 or client articles. Client articles include articles associated with the user 112a or client device 102a, such as the user's emails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, any alphanumerical identifier, or other suitable information that may identify an article. In another embodiment, the result set also includes article identifiers for articles located on other systems on the network 106, e.g., network articles located by a search engine on a server device. Network articles include articles located on systems on the network 106 not previously viewed or otherwise referenced by the user 112a, such as web pages not previously viewed by the user 112a.

The formatter 134 can receive the search result set from the query system 132 of the search engine 122 and can format the results for output to a display processor 128. In one embodiment, the formatter 134 can format the results in XML, HTML, or tab delineated text. The display processor 128 can be contained in memory 108 and can control the display of the result set on a display device associated with the client device 102a. The display processor 128 may include various components. For example, in one embodiment, the display processor 128 includes a Hypertext Transfer Protocol (HTTP) server that receives requests for information and responds by constructing and transmitting Hypertext Markup Language (HTML) pages. In one such embodiment, the HTTP server includes a scaled-down version of the Apache Web server. The display processor 128 can be associated with a set of APIs to allow various applications to receive the results and display them in various formats. The display APIs can be implemented in various ways, including, for example, as DLL exports, COM interface, VB, JAVA, or .NET libraries, or as a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query included in an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can include a related information server or an advertising server. Similar to the client devices 102a-n, the server device 150 can include a processor 160 coupled to a computer-readable memory 162. Server device 150, depicted as a single computer system, may be implemented as a network of computer processors. Examples of a server device 150 include servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a network search engine 170. The search engine 170 can locate relevant information from the network 106 in response to a search query from a client device 102a. The search engine 170 then can provide a result set to the client device 102a via the network 106.

The result set can include one or more article identifiers. An article identifier may be, for example, a Uniform Resource Locator (URL), a file name, a link, an icon, a path for a local file, or anything else that identifies an article. In one embodiment, an article identifier can include a URL associated with an article.

In one embodiment, the server device 150, or related device, has previously performed a crawl of the network 106 to locate articles, such as web pages, stored at other devices or systems coupled to the network 106, and indexed the articles in memory 162 or on another data storage device.

It should be noted that other embodiments of the present invention may include systems having a different architecture than that which is shown in FIG. 1. For example, in some other embodiments of the present invention, the client device 102a is a stand-alone device and is not coupled to a network.

Figure 2:
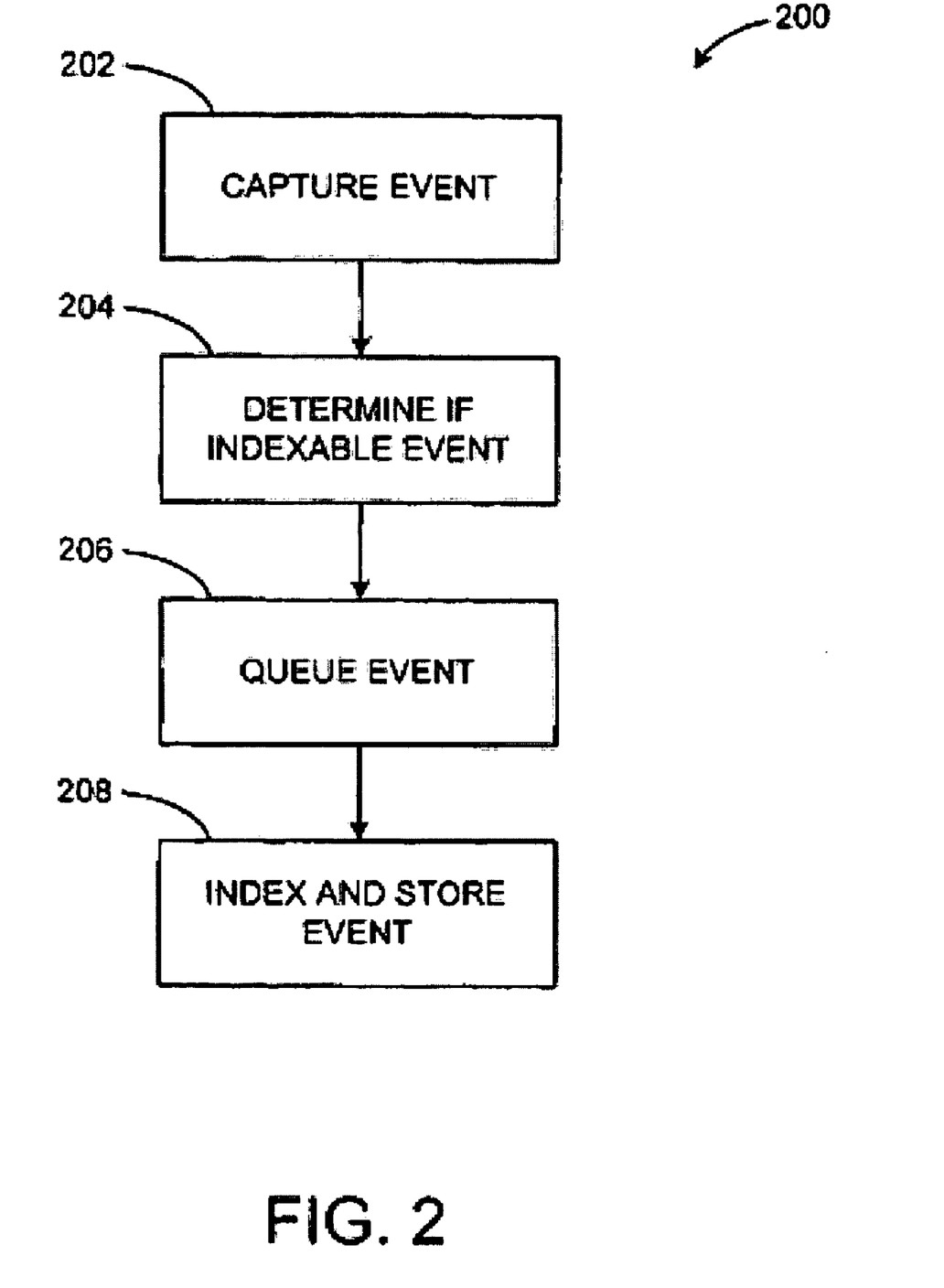
FIG. 2 is a flow diagram illustrating an exemplary embodiment of a method for capturing and processing event data associated with a client device.

Now referring to FIG. 2, a flow diagram illustrating an exemplary embodiment of a method for capturing and processing event data associated with a client device is shown. It should be noted that various event data capturing and processing methods in accordance with embodiments of the present invention may be carried out. For example, in one embodiment, application data is captured based on an application program interface ("API") associated with an application that is provided for interacting with the application. In another embodiment, keystrokes associated with an application are captured and events are determined based on, among other things, actions associated with the keystrokes. In another embodiment, display elements and related information is captured and events are determined based on, at least in part, the captured display information. These are some non-exhaustive examples of the multiple event data capturing and processing methods in accordance with embodiments of the present invention.

In one embodiment, it can be determined whether to index the event, and the event can be indexed and stored if it is so determined.

FIG. 2 illustrates an exemplary method 200 that provides a method for capturing and processing a real-time event. This exemplary method is provided by way of example, as it will be appreciated from the foregoing description of exemplary embodiments that there are a variety of ways to carry out methods in other embodiments of the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, the capture processor 124 captures an event. The capture processor 124 can capture an event by identifying and compiling event data associated with the event upon the occurrence of the event. The capture processor 124 may have separate capture components for each client application, network monitoring, performance data capture, keystroke capture, and display capture. For example, an event can occur when a user 112a types a predetermined number of words in a client application. The event data associated with this event can be, for example, the application used for the input, the format of the text, the words input; and the time input. In one embodiment, the capture component can use a generalized event definition mechanism, such as an event schema that it has previously registered with the client device 102a, to capture or express the event.

Figure 3:
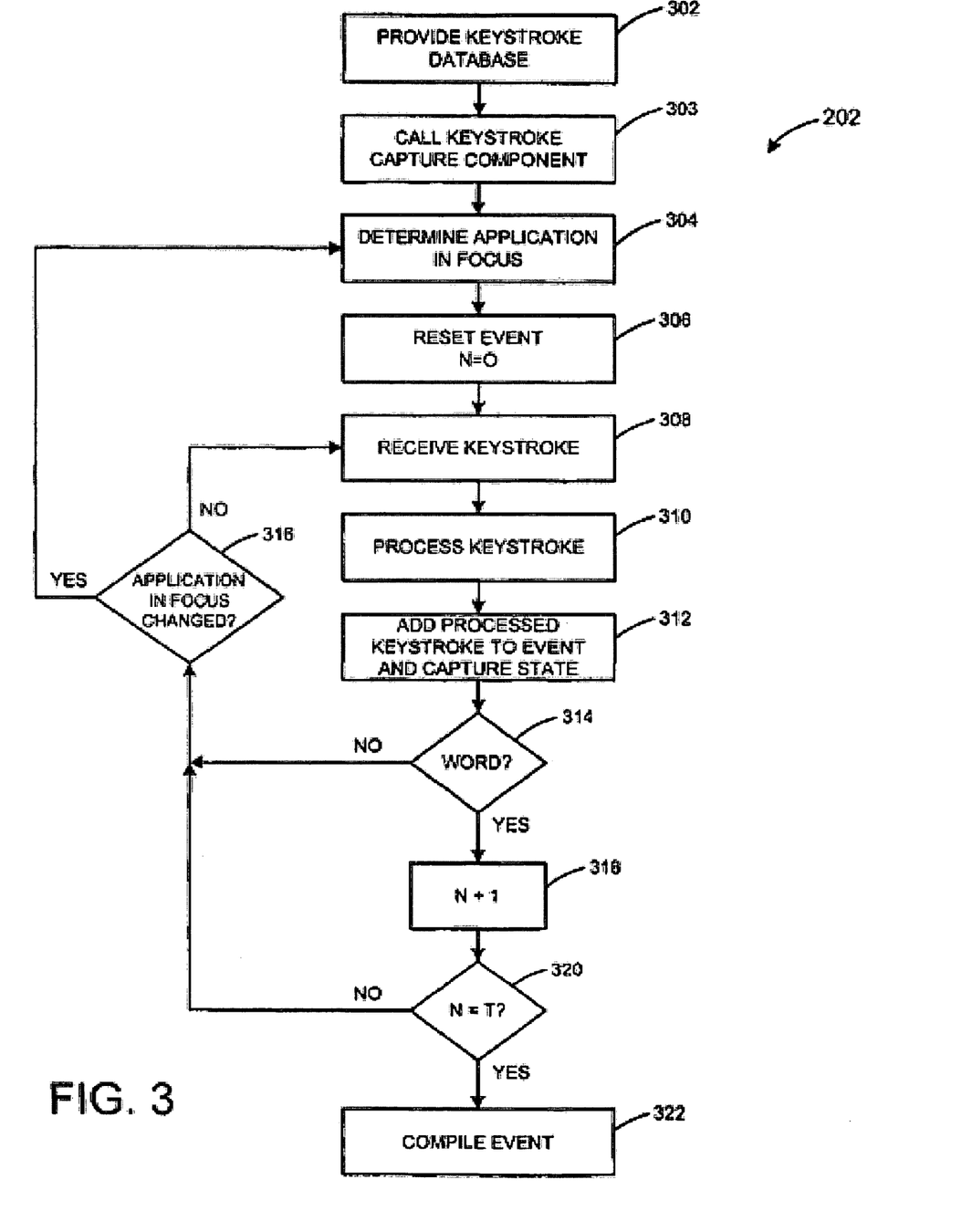
FIG. 3 is a flow diagram illustrating an exemplary embodiment of a method for capturing keystroke information on a client device.

FIG. 3 provides an example of capturing a real-time event of step 202. Specifically, FIG. 3 shows a flow diagram illustrating an exemplary embodiment of a method for capturing keystroke information on a client device. In this embodiment, a plurality of keystrokes associated with an application is received, each keystroke is processed to determine an associated action forming a plurality of associated actions, and an event is determined based at least in part on the plurality of associated actions. An application in focus can first be determined.

In one embodiment, the event can be a number of words and it can be determined that the plurality of associated actions forms a word or words. The word or words can be determined at least in part by the receipt of at least one keystroke indicating a space or a punctuation symbol. In another embodiment, the event can be a number of characters and it can be determined that the plurality of associated actions form a character or characters.

In one embodiment, a capture state can be updated after each keystroke is processed. In one embodiment, a current user state can be updated based at least in part on the event. The event can be indexed and stored.

In one embodiment, each associated action can be determined at least in part by matching the keystroke to an entry in a keystroke table and determining an action in the keystroke table associated with the entry. The action can include one of adding a character to a word, deleting a character from a word, inserting a character, overwriting a character, deleting a word, deleting a paragraph, selecting an item, and repositioning the cursor. The keystroke table can be associated with the application or can be a generic keystroke table.

In another embodiment, keystrokes associated with an application are received, an event is determined based on user input, and it is determined whether to index the event. User input can be one or more of a number of words determined from the keystrokes, a number of characters determined from the keystrokes, and a change is focus from the application to another application. Determining whether to index the event can include determining whether the event is important to the user.

In 302, a keystroke database is provided. The keystroke database can contain, for various client applications, tables of keystroke commands and the respective action for each command. In one embodiment, the keystroke database has a separate table for each separate client application. A generic table may be used for an application if a specific table does not exist for the particular application. In one embodiment, the same table may be used for groups of applications. For example, the same table may be used for applications from the same developer. For example, the same table may be used for all Microsoft® applications and a different table may be used for all applications from Lotus®. Additionally, the same table may be used for related applications, such as Office® applications from Microsoft®, or word processing applications from any developer. The keystroke tables can be created manually for each application. Alternatively, the keystroke tables can be created automatically by automatically determining respective actions of each keystroke for each application.

In 303, the keystroke capture component is called. The keystroke capture component can operate regularly or even constantly so that it monitors all keystroke activity or can be selectively called by the capture processor 124 or other capture components when needed or at various times. In 304, the keystroke capture component can determine the client application in focus. The application in focus is the client application currently being used by the user 112a. For example, it can be the client application that the user 112a is inputting text in. In one embodiment, the application in focus is determined so that the keystroke capture component can use the keystroke table associated with the application in focus from the keystroke database. For example, if the application in focus is a specific word processing application, the keystroke capture component can call up the corresponding specific word processing application keystroke table.

In 306, the event data is reset by the keystroke capture component. In one embodiment, event data is complied in an event in a format defined by an event schema and the keystroke capture component can register a specific keystroke capture event schema, and resetting the event includes clearing out any existing event data. A counter N can also be reset. In one embodiment, the counter counts the number of words captured by the keystroke capture component. In such an embodiment, when the event is reset the counter is reset to zero.

In 308, the keystroke capture component captures a keystroke input by the user 112a. A user can input a keystroke through a variety of input devices, such as a keyboard. A keystroke can include a single key input or a multiple key input and can include a text input and an editing command input. For example, a keystroke can include the "G" key or the "Shift" and the "G" keys. A keystroke can also include the "Backspace" key or the "Control" and "Backspace" keys. The keystroke capture component can receive a keystroke by receiving keystroke messages through an application callback that can be invoked by the operating system. The keystroke capture component can also receive a keystroke through monitoring an input buffer, such as a keyboard buffer, at the operating system level. Other methods of inputting characters, such as handwriting, can be captured.

In 310, the keystroke capture component processes the keystroke. In the embodiment shown, the keystroke capture component processes the received keystroke by matching the keystroke to an entry in the keystroke table for the specific application in focus, and determining the respective action for the keystroke. For example, if the received keystroke is the "SHIFT" key and the "G" key in a specific word processing application, the keystroke capture component can match the "SHIFT" key and the "G" key in the keystroke table for the specific application and determine the associated action, for example, the output of the letter "G". If the received keystroke is the "Control" and "Backspace" keys, the keystroke capture component can match these keys with the respective action in the keystroke table for the specific application and determine the associated action, for example, the action of deleting the word preceding the cursor. Other possible actions include moving the cursor up or down one line, moving the cursor up or down one paragraph, and moving the cursor to the beginning or end of a document, for example. The keystroke capture component can keep track of the current position of the cursor with respect to previous characters entered. For example, if the user types 5 characters, hits "left arrow" three times, types one character, and hits "right arrow" three times, the component can identify that the user went back and inserted a character in the word (for applications where "left arrow" corresponds with moving the cursor back one character). The component can further keep track of whether each application is in "insert" mode, so that it knows if new characters overlay any existing characters.

In another embodiment, the keystroke capture component may not process the keystrokes directly. Instead, the keystroke capture component may first pass keystrokes to the operating system, as if the user had actively sent them to the keyboard capture component, and not an application. In this way, the operating system can do the work of translating keystrokes into higher level messages (characters, key movement, etc.), and can then return these messages to the keystroke capture component for further processing. Sending keystrokes to the operating system for intermediate processing, instead of processing them directly, may be advantageous for several reasons. For example, it may avoid some of the difficulties of handling multi-keystroke characters (including non-English character entry), and it may ensure keystrokes get processed in a manner that is consistent with operating system behavior.

In 312, the keystroke capture component adds the processed keystroke to the event data. In the embodiment shown, the keystroke capture component captures event data as described by the event schema and the processed keystroke is added to the event data. For example, if the processed keystroke indicates the addition of the letter G, the letter G is added to the event data. If the processed keystroke indicates to delete the word preceding the cursor and a word is contained in the event data this word can be deleted. Additionally, the keystroke capture component can add the processed keystroke to a capture state. The keystroke capture component can maintain the capture state containing previous keystrokes as it is determined what recent word(s) the user has entered. The capture state can be updated before an event is generated.

In 314, the keystroke capture component determines if a complete word has been added to the event. A word can be a series of characters representing a spoken word, abbreviation, term, or semantic unit. For example, "WORLD SERIES", "ASCII", "MR" and "GOOGLE" can be words. The keystroke capture component can determine if a complete word has been entered by a variety of methods. In one embodiment, the keystroke capture component looks for a series of characters followed by a space, such as "GOOGLE", or certain punctuation characters, such as "GOOGLE," to determine if a complete word has been entered. If a complete word has not been entered, then the keystroke capture component goes to step 316. In 316, the keystroke capture component can determine whether the application previously in focus is still in focus or if the application in focus has changed and another application is now in focus. If the application in focus has not changed, the keystroke capture component returns to step 308 and receives another keystroke. If the application in focus has changed, the keystroke capture component returns to step 304 and determines the current application in focus. If the keystroke capture component identifies an action such as moving the cursor up one line, it may update the capture state to reflect the new cursor location. If the keystroke capture component does not have the capture state for that location, or cannot accurately pinpoint the new location, it may simply reset any partially captured word. As another example, the keystroke "shift left arrow" may select the previous character in a particular application. The keystroke capture component can recognize this action and possible subsequent actions such as deleting the selection or pasting the selection elsewhere in the document.

If, in step 314, the keystroke capture component determines that a complete word has been received, then in step 318 the counter N is incremented by one. In step 320, the capture processor determines if the counter N equals an integer T. The integer T can be, for example, a number of words. The number of words can be predetermined or can be determined based on a variety of suitable factors, such as the current application in focus or other user activity. In one example, T equals one so that the keystroke capture component may create an event upon the identification of each word entered by the user 112a. Alternatively, T can be a number of characters. Like the number of words, the number of characters can be predetermined or can be determined based on a variety of suitable factors. If, in step 320, N is found not to equal T, then the keystroke capture component goes to step 316, where the keystroke capture component determines if the application in focus has changed. If the keystroke capture component determines that N does equal T, then the keystroke capture component proceeds to step 322. For example, if N is a counter counting the number of words captured and T is set to one and "GOOGLE" is received, then the keystroke capture component proceeds to step 322.

In 322, the keystroke capture component compiles the event. In the embodiment shown, the keystroke capture component compiles the event by compiling the event data associated with specific fields described by the event schema. For example, the event data can include the application used for the input, the format of the text, the word or words input, and the time input. When the keystroke capture component has compiled the event, the method 200 can continue at step 204 as shown in FIG. 2.

Figure 4:
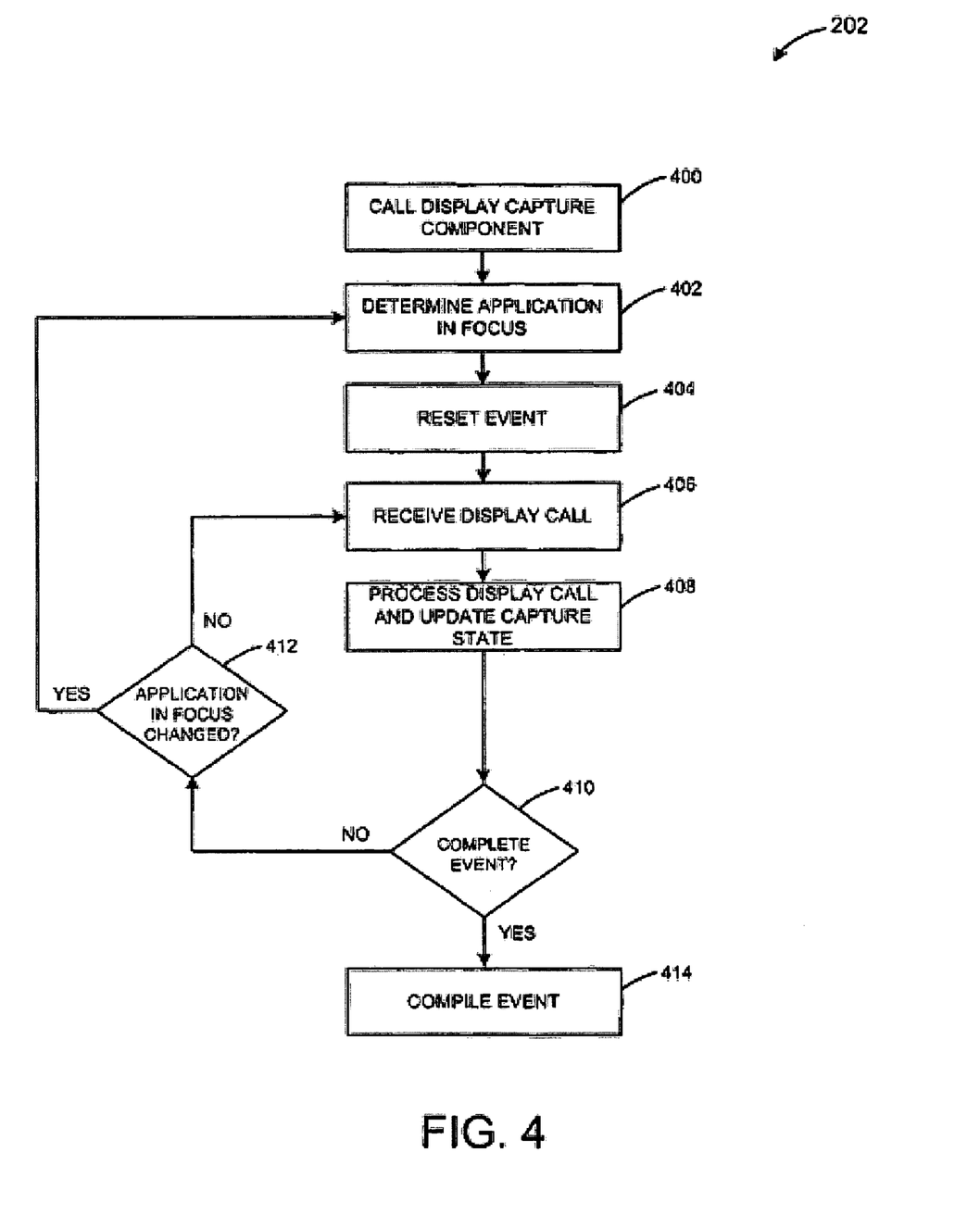
FIG. 4 is a flow diagram illustrating an exemplary embodiment of a method for capturing display information on a client device.

FIG. 4 provides another example of capturing an event, for example, a real time event 202 as shown in FIG. 2, based on display information. FIG. 4 shows a flow diagram illustrating an exemplary embodiment of a method for capturing display information on a client device. Typically, applications in a client device invoke display calls to display information associated with the application on a user display, such as a monitor, liquid crystal display, plasma display, or the like. In one embodiment, the capture processor 124 includes a display capture component for determining events based on, at least in part, the displays or windows associated with applications. It should be noted that windows associated with applications may be hidden or displayed and visible to the user at any given time. Information on a display can be determined at least in part by using an array of a current state of the display. and updating the array with display calls. Information on a display can also be determined, at least in part, by constructing display items based at least in part on display positions of the display calls. The display calls can be processed by analyzing one or more of the x,y coordinates, lengths, or relative positions of several items output to the display using display calls.

In one embodiment, an application in focus is first determined from which to capture associated display information to generate events. Events can include, for example, a number of words determined to be output on the display. In one embodiment, a capture state can be updated after each display call is processed and a current user state can be updated based at least in part on the event.

With respect to FIG. 4, initially, a display capture component is called 400. The display capture component can operate regularly, e.g., on a schedule, or even constantly so that it monitors all display activity, or can be selectively called when needed. Then, the application in focus is determined 402. In one embodiment, the application in focus is the client application currently being used. For example, in a windows-based operating system environment the display capture component determines which window the user is actively using.

For a first or new call, the event is reset 404. An event may be reset for a variety of reasons, such as, for example, the user having switched the application in focus, an event having been captured and sent for processing, or for a variety of other reasons. In one embodiment, resetting 404 an event includes indicating or generating a new event. The existing event data prior to the resetting 404 is saved in a capture state and maintained until the reset. The indication of a new event triggers the sending of the existing event data in the previous event for processing. For example, in one embodiment, the reset function saves the previous event and sends it to the queue 126 before initializing the new event. In one embodiment, new events can be generated according to an event schema associated with an event type. The event schemas can include formatting for various data fields associated with the different types of events.

Next, a display call is received 406. For example, in one embodiment, the display capture component receives a display call. A display call can be an instruction sent by the operating system to the display device associated with the client device that instructs the display device to display an item or change the display of an item on the display device. For example, the display call can be to display the text "Google" in font "Times New Roman" at a display position, such as position x,y. This display call can, for example, cause the display on the screen of a computer monitor of the text "Google" at the position x,y in the active window and in the font "Times New Roman". A display call can also be, for example, to delete an item at a given position, change the font of a word, change the position of an item on the display, or the like. In one embodiment, display calls can also be determined by injecting code into applications or through the use of Dynamic Link Libraries ("DLLs") to hook and intercept operating system API calls as further detailed below. In another embodiment, other methods of output, such as calls to a printer driver, an audio driver, or the like, can also be captured.

After the display call is received 406, the display call is processed 408 to determine the event data associated with the current display. The display includes the visual information the user sees in the window or windows. In one embodiment, the event data associated with the current display is captured and placed in an event format according to an event schema associated with the particular event type or application. In one embodiment, the captured event data may be saved or maintained in a capture state, for example, by keeping an array of items that have been output to the current display. For example, in one embodiment, a display capture component can use the x and y coordinates of the items to determine words, spaces between words, and the beginning of a new line. The display call may be used by the display capture component to update the array of the current display. For example, if the display call is to write the text "Google" in font "Times New Roman" at position x,y, previously displaying the word "Goolge," then the text "Google" in font "Times New Roman" is added to the display at position x,y replacing the text "Goolge." The updated array associated with the current display, including the text "Google" can then be added to the event. The capture state can also be updated by replacing the previous state array, "Goolge," with the updated array, "Google." Accordingly, updates to the display can be reflected in the associated event for as long as the event is not complete.

Whether a complete event has occurred is next determined 410. In one embodiment, to determine 410 whether an event is complete, a complete condition is checked. For example, a complete condition can include adding a single word or a predetermined number of words to the display on the display device. Alternatively, as another example, a complete condition can include a particular user action on the display, e.g., a mouse click on a hyperlink, a button, a menu item, or the like. If a complete event has not yet occurred, then it is determined 412 whether the application in focus has changed. If the application in focus has not changed, the next display call associated with the active window is received 406. Conversely, if the application in focus has changed, the new application in focus is again determined 402 and the capturing process for a new event starts.

If it is determined 410 that a complete event has occurred, then the completed event is compiled 414. For example, in one embodiment, the display capture component compiles an event by providing all the event related data according to an event schema. The event data can include the application used, the format of the display, the time of display, the content displayed, the font and font size of any words displayed and any other data associated with the event that can be subsequently useful for indexing or to a user.

Figure 5:
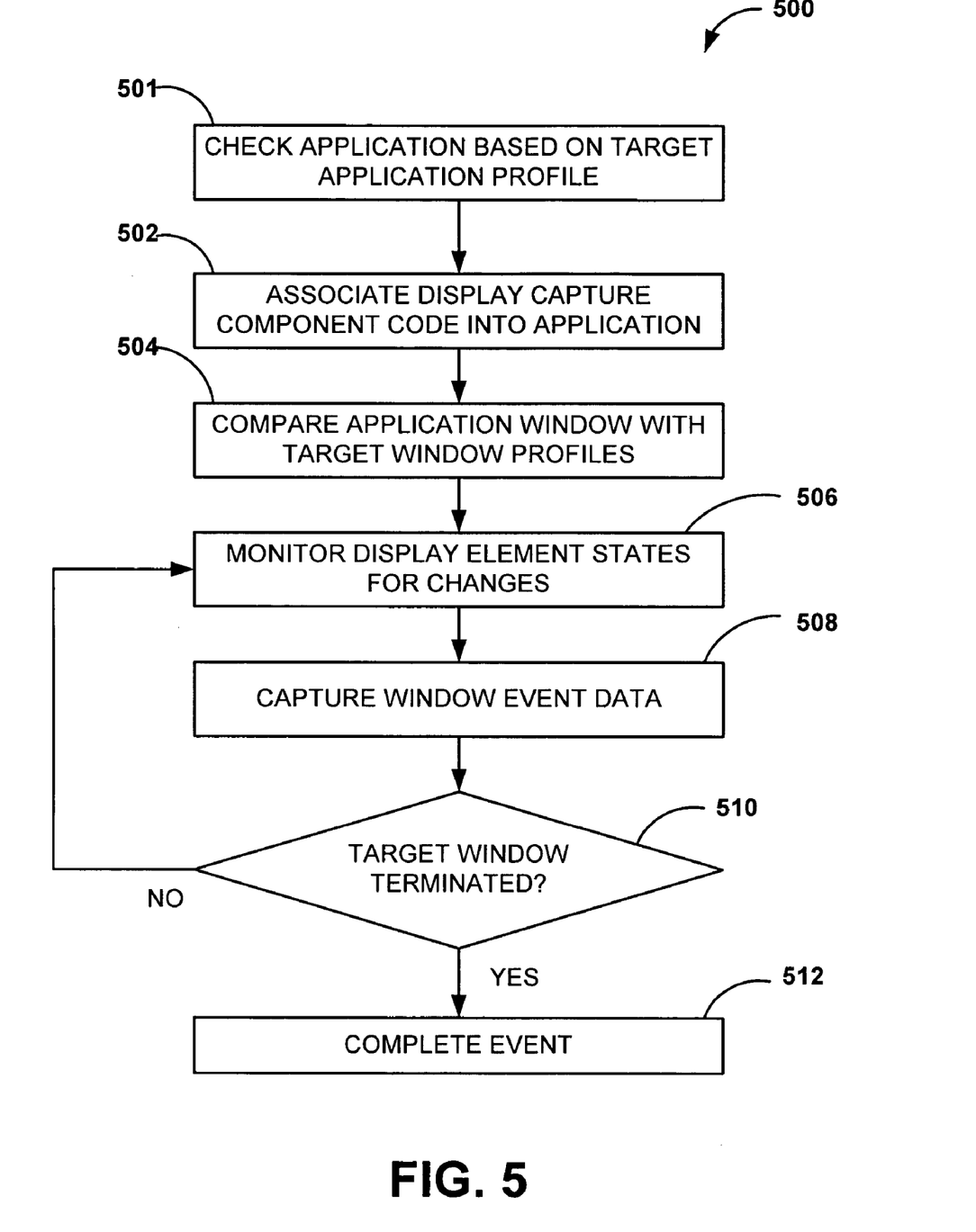
FIG. 5 is a flow diagram of one embodiment of a profile based display capture method.

Now referring to FIG. 5, a flow diagram of one embodiment of a profile based display capture method 500 is shown. In this embodiment, a display capture component can be configured to capture information associated with windows for selected applications. The application windows may be displayed in the user's view or hidden within the computer system. Some examples of selected applications for which display capture components may be configured include applications that do not provide a public API, applications that encrypt or otherwise protect against data capture from its application windows, or the like. The capture processor in this embodiment can include several capture components. For some of the target applications from which event data is captured, a profile-based capture component is used.

Accordingly, in one embodiment, upon initialization of the capture component process, preexisting applications with associated windows are first checked 501 in order to determine their identity. In one embodiment, a target application profile is used for determining the identity of the running applications. The application profile includes identifying information associated with the target applications. The application profile may include, for example, a unique window class name associated with windows of a target application (whether hidden or displayed), a unique system path name for stored binary files associated with the target application, operating system registry entries associated with the target application, or the like. In one embodiment, upon initialization and after the existing applications are checked 501, notifications for subsequent window creation events are received, for example, by subscribing through the operating system to window creation events. For every window creation event, the originating application is checked 501 to determine if it is a selected target application.

Once a target application is identified, computer code for an application-specific display capture component is associated 502 with the target application. For example, in one embodiment, a Windows® API based hook is set to load the display capture code from a dynamic link library ("DLL") into the target application process. In one embodiment, the display capture code circumvents the encryption/data capture protection features of the target application by modifying, intercepting, or bypassing its interactions with the operating system.

In one embodiment, event data from a target application is derived from a subset of the windows associated with the target application. Accordingly, the windows associated with the target applications are compared 504 with stored window profiles. The window profiles contain information that can be used to identify. target windows, including, for example, text to be contained in the window's title, the number and type of display elements (e.g., buttons, pull-down menus, text input boxes, and the like), text to be displayed on display elements, the location or arrangement of display elements, and the like.

For example, in one embodiment, a text window of an instant messaging ("IM") target application is the target window. The instant message text (both that which is input, and that which is received) is the event data to be captured and associated with an IM event (i.e., one data field in the IM event schema includes the text exchanged by the users in one session). The window profile in this example (i.e., the window profile of the target window, which is the IM conversation window) includes the string "Chatting with" in the window title, a "Send" button, and a large free text input box.

For each target window in the target application, the state of display elements or other target window display related variables is monitored 506. For example, the state of handlers associated with display buttons or equivalent keyboard shortcuts (e.g., the "Send" button or the Ctrl+Enter key sequence) is monitored. Upon detection of the state change of a display element (e.g., a button) of interest, event data in the target window is captured 508.

In one embodiment, the data capture is enabled by the display capture component code hooked into the target application process. This code intercepts operating system messages between the target application and the operating system, and modifies responses to these operating system messages in order to enable the data capture. For example, in a Windows® based system, an application configured to provide an empty string in response to every "get text" command (e.g., WM_GETTEXT) is modified by the capture component code to use the default handler to provide the window display text. Thus, the capture component code inserted into the target process allows the modification of application behavior, for example, to bypass data capture prevention measures from within the process.

The event data display capture 508 can be repeated based on state changes, and the capture state associated with an event can be updated with newly captured event data. For example, for every user click on the "Send" button in an IM application, the text associated with an instant message chat session can be captured 508 and stored in memory in a data structure associated with an IM event for the current session. Subsequent clicks on the "Send" button can cause the capture of additional text exchanges in the IM session between the users. Such state-based data capture beneficially provides an efficient scheme to capture display data upon user interaction with a target window. Time-based polling schemes can be less efficient since they may operate even if the user does not provide any new input to the target process. Moreover, state-based data capture can reduce the likelihood of missing some entered data because generally, after a user input, some state change is required (e.g., clicking on a "Send" button, an "OK" button, a "Continue" button, or typing equivalent keyboard shortcuts or the like).

Referring again to FIG. 5, the state of the target window termination is monitored 510. Upon termination of the target window an event can be completed 512. Any event data entry into the event data store can be finished and the captured event can be sent to the indexer. While the target window remains active, the display capture can continue for every state change in the window.

Referring now back to FIG. 2, once an event is captured (e.g., as described with respect to FIGS. 4 and 5), the event. data processing method proceeds with step 204. The keystroke capture component described with respect to FIG. 4 and the display capture component described with respect to FIG. 5 can be used together in a capture processor 124, in addition to other capture components, to determine user activity (for example, what the user is viewing on a visual output device, such as a display). Other capture components can include audio and video data capturing techniques, e.g., voice recognition, image processing, and the like, for audio and video events that can be included in the index.

After an event is captured, it is determined 204 whether the event is an indexable event. As explained above, some real-time events may not be indexed (non-indexable real-time events). In one embodiment, non-indexable real-time events are used to update the current user state and can be, for example, examining a portion of an article, changing an article, and closing an article. In this embodiment, non-indexable events are not indexed or sent for storage by the indexer 130. Indexable events can be indexable real-time events or historical events. Keystrokes and display calls can be non-indexable events, such as the input of a number of words by a user or the display of a number of words on a display device. Keystrokes and display calls can also be indexable events, such as, for example, when an entire article or portion of an article is input by a user or displayed on a display device.

If an indexable event is determined 204, then, the event can be sent 206 for indexing, e.g., to queue 126, with an indication that it is an indexable event. In the embodiment shown in FIG. 1, indexable real-time events are sent to both a user state queue and an index queue within queue 126, and historical events are sent to the index queue within the queue 126. Alternatively, indexable real-time events may not be sent to the user state queue to save computational time. The capture processor 124 can send the event in a form described by an event schema to the queue 126.

If the event is determined 204 to be a non-indexable event, then, the non-indexable event can be sent 206 for further processing, e.g., to a user state queue of the queue 126, with an indication that it is not to be indexed. For example, when a user is composing an email a capture component can capture a number of words input by the user in the composition of the email. A capture component can capture the input text as an event. While this event can be helpful in determining a current state of the user 112*a,* it may not be important enough to be indexed and sent for storage by the search engine, so that the user may later retrieve this information. Alternatively, in an example where a user opens a received email, such an event can provide information on a current user state, but it can also be indexed and sent for storage by the search engine 122, because the user 112a may later be interested in retrieving this email.

In one embodiment, the queue 126 holds the event until the search engine is ready to receive it. Based on the event data, the event can be prioritized on the queue 126 for handling. For example, historical events can be given a lower priority for processing by the queue 126 than real-time events. In one embodiment, when the indexer 130 is ready to process another event, it can retrieve one or more events from the index queue in the queue 126. The query system 132 can retrieve one or more events from the user state queue of the queue 126 when it is ready to update the user state. In another embodiment, a queue is not used and events are sent directly to the search engine 122 from the capture processor 124.

After indexing determinations are made 204 and events are properly queued 206, events are indexed and stored 208. In one embodiment, the indexer 130 can retrieve an event from the queue 126 when it is ready to process the event. The indexer 130 determines if the event is a duplicate event and if not assigns an Event ID to the event. The indexer 130 can also associate the event with related events. For example, in an embodiment as shown in FIG. 2, using the event schema, the indexer 130 determines indexable terms associated with the event, dates and times associated with the event, and other data associated with the event. The indexer 130 can associate the Event ID with the indexable terms that are contained in the index 142. The event can be stored in the database 144 and the content of the event can be stored in the repository 146.

The environment shown reflects a client-side search engine architecture embodiment. Other embodiments are possible, such as a stand alone client device or a network search engine.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer based method for capturing event data from a window of an application in a computer system, the method comprising:
    receiving, with a capture processor executing in the computer system, window creation information about a window created by the application;
    determining, with the capture processor, whether the application is an instance of a target application by comparing the window creation information with a target application profile;
    responsive to a determination that the application is an instance of the target application, determining, with the capture processor, whether the created window is an instance of a target window by comparing the window creation information with a target window profile associated with the target application; and
    responsive to a determination that the created window is an instance of the target window, capturing and storing, with the capture processor, event data from the created window upon detecting a state change of a state associated with an element in the window.

2. The method of claim 1, wherein capturing event data further comprises storing captured window information in a data structure associated with an event according to an event schema.

3. The method of claim 2, further comprising indexing and storing the event.

4. The method of claim 1, further comprising:
    updating a capture state of an event with additional captured event data from the created window in response to a subsequent state change of the state associated with the element in the window.

5. The method of claim 1, wherein the element in the window includes at least one of a button, a pull-down menu, or a hyperlinik.

6. The method of claim 1, wherein the window creation information includes at least one of a window class name, a path name, or a registry entry associated with the first application.

7. The method of claim 1, wherein the target application profile includes at least one of a window class name, a path name, or a registry entry associated with the target application.

8. The method of claim 1, wherein the target application is associated with a plurality of target window profiles, each target window profile comprising identifying display element information for windows from which to capture data.

9. The method of claim 1, further comprising:
    associating display capturing code with the application.

10. The method of claim 9, wherein the display capturing code modifies responses of the application to operating system requests.

11. The method of claim 10, wherein the operating system requests include messages from other applications based on an application programming interface associated with the operating system.

12. The method of claim 10, wherein the operating system requests include requests for text in the created window.

13. The method of claim 9, wherein associating display capturing code includes setting a hook with respect to the application.

14. The method of claim 13, wherein the hook is configured to intercept messages between an operating system and the application.

15. A method for indexing events, comprising:
    receiving, with a capture processor executing in a computer system, a plurality of display calls associated with computer applications in the computer system;
    determining, with the capture processor, whether a computer application from which a received display call is associated is an instance of a target application based on a plurality of stored target application profiles;
    responsive to a determination that the computer application is an instance of the target application, processing, with the capture processor, the plurality of display calls to determine whether a window created by the computer application is an instance of a target window based on a target window profile;
    responsive to a determination that the created window is an instance of the target window, determining, with the capture processor, an event based at least in part on data captured from the created window; and
    indexing, with the capture processor, the data captured from the created window and storing the event.

16. The method of claim 15, further comprising capturing text input to the created window by a user and wherein the event includes the captured text.

17. The method of claim 15, further comprising:
    capturing at least one of the plurality of display calls; and
    updating a capture state after the display call is captured.

18. The method of claim 17, wherein the updating is in response to a state change associated with a display element of the created window.

19. The method of claim 15, wherein indexing and storing the event takes place after terminating the created window.

20. The method of claim 15, wherein processing the plurality of display calls comprises comparing one or more of x,y coordinates, lengths, and relative positions of a plurality of display items written to the display using display calls with the target window profile.

21. A method, comprising:

comparing, with a capture processor executing in a computer system, application related data from applications associated with windows executing in the computer system with stored target application profiles associated with a plurality of target applications;

subscribing, with the capture processor, to window creation events through an operating system in the computer system;

receiving, with the capture processor, window creation request information from an application;

comparing, with the capture processor, the window creation request information with the stored target application profiles;

establishing, with the capture processor, a hook with capture component code into processes for each application matching to a target application profile;

comparing, with the capture processor, window element information for each process of each target application with a plurality of stored target window profiles associated with target windows of the target applications;

monitoring, with the capture processor, state changes for states associated with display elements in windows matching a target window profile;

capturing and storing, with the capture processor, from each matched window event data into an event associated with each matched window upon detecting a state change of the monitored states, wherein capturing comprises modifying application behavior of the matched applications based on the capture component code; and completing the events associated with the matched windows in response to closure of the matched window.

22. A method, comprising:

determining, with a capture processor executing in a computer system, whether an application is an instance of a target application by comparing application related data from the application associated with a window executing in the computer system with a target application profile associated with a target application, wherein the target application is configured to provide an empty string in response to a window text request;

establishing, with the capture processor, a hook with capture component code into a processes for the application, the capture component code configured to intercept messages between the application and an operating system;

determining, with the capture processor, whether a window associated with the application is an instance of a target window of the target application by comparing window information from the window associated with the application with a target window profile associated with the target window;

monitoring, with the capture processor, state changes for states associated with display elements in the window;

capturing, with the capture processor, text within the window upon detecting a state change of the monitored states, wherein capturing comprises intercepting a window text request and providing the window text prior to the application responding to the window text request; and indexing, with the capture processor, the captured text upon termination of the window.

23. A computer program product having a computer-readable storage medium having computer-executable program instructions embodied therein for capturing event data from a-window of an application comprising:

a software portion for receiving window creation information about a window created by the application;

a software portion for determining whether the application is an instance of a target application by comparing the window creation information with a target application profile;

a software portion for determining whether the created window is an instance of a target window by comparing the window creation information with a target window profile associated with the target application responsive to a determination that the application is an instance of the target application; and a software portion for capturing event data from the created window upon detecting a state change of a state associated with an element in the window responsive to a determination that the created window is an instance of the target window.

* * * * *